US012626011B2

(12) United States Patent
Bijou et al.

(10) Patent No.: US 12,626,011 B2
(45) Date of Patent: May 12, 2026

(54) SYSTEMS AND METHODS FOR MANAGING AND SECURING SENSITIVE ELECTRONIC FILES

(71) Applicant: Wells Fargo Bank, N.A., San Francisco, CA (US)

(72) Inventors: Blair Bijou, New York, NY (US); Carrie Anne Hanson, Charlotte, NC (US); David Price, Kennewick, WA (US); John Andrew Chuprevich, Davidson, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 158 days.

(21) Appl. No.: 18/477,221

(22) Filed: Sep. 28, 2023

(65) Prior Publication Data

US 2025/0111078 A1    Apr. 3, 2025

(51) Int. Cl.
| | |
|---|---|
| *G06Q 20/02* | (2012.01) |
| *G06F 16/16* | (2019.01) |
| *G06F 21/62* | (2013.01) |
| *G06Q 20/10* | (2012.01) |
| *G06Q 40/02* | (2023.01) |

(52) U.S. Cl.
CPC .......... G06F 21/6245 (2013.01); G06F 16/16 (2019.01); G06Q 40/02 (2013.01)

(58) Field of Classification Search
None
See application file for complete search history.

(56) References Cited

U.S. PATENT DOCUMENTS

| | | | | |
|---|---|---|---|---|
| 8,572,411 | B2 * | 10/2013 | Ginter | ................ G06Q 30/0601 |
| | | | | 345/59 |
| 9,384,478 | B2 * | 7/2016 | Calman | .............. G06Q 20/3223 |
| 10,489,754 | B2 * | 11/2019 | Fineman | ................ G06Q 20/02 |
| 10,893,016 | B2 | 1/2021 | Thrower, III | |
| 2012/0330971 | A1 | 12/2012 | Thomas | |
| 2013/0060679 | A1 * | 3/2013 | Oskolkov | ............ G06Q 20/322 |
| | | | | 705/39 |
| 2015/0052035 | A1 | 2/2015 | Calman | |
| 2015/0295876 | A1 | 10/2015 | Newman | |
| 2016/0012411 | A1 * | 1/2016 | Kursun | ................. G07F 19/205 |
| | | | | 705/42 |
| 2023/0004424 | A1 * | 1/2023 | Represas | ................ G06Q 10/06 |

* cited by examiner

*Primary Examiner* — Christopher B Robinson
(74) *Attorney, Agent, or Firm* — K&L Gates LLP

(57) ABSTRACT

Systems, apparatuses, methods, and computer program products are disclosed for managing and securing sensitive electronic files. An example method includes obtaining, by interface circuitry, an electronic file associated with a third-party application. The method also includes determining, by a classification engine, a first classification of the electronic file. The method also includes, in an instance in which the first classification of the first electronic file corresponds to a first predefined classification, determining, by the classification engine, a second classification of the first electronic file, selecting, by an inbox allocation engine and based on the second classification of the electronic file, a first storage location associated with an electronic file inbox of a mobile banking application, and storing, by the inbox allocation engine, the electronic file in association with the first storage location.

20 Claims, 8 Drawing Sheets

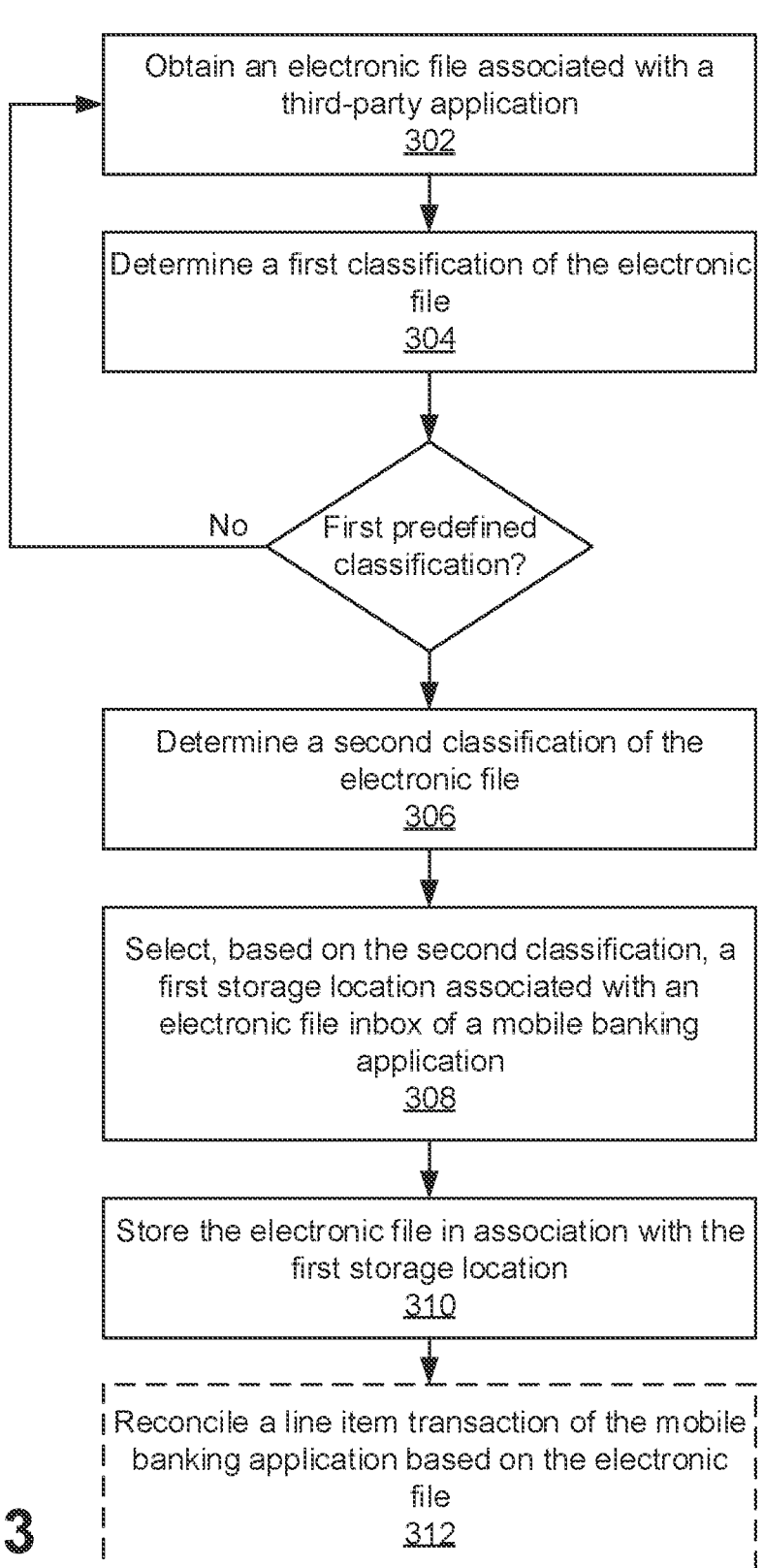

Obtain an electronic file associated with a third-party application
302

Determine a first classification of the electronic file
304

First predefined classification?

No

Determine a second classification of the electronic file
306

Select, based on the second classification, a first storage location associated with an electronic file inbox of a mobile banking application
308

Store the electronic file in association with the first storage location
310

Reconcile a line item transaction of the mobile banking application based on the electronic file
312

FIG. 3

Generate machine-readable indicia for the first storage location
502

Receive an indicia display request associated with the first storage location
504

Cause presentation of the machine-readable indicia for the first storage location via a display of a device
506

Receive an electronic file display request
602

Request authentication data from a user in response to the electronic file display request
604

Validate the authentication data
606

Successful validation?

Cause display of the electronic file
608

Receive, from a first device, an electronic file export request comprising destination information
802

Cause transmission of the electronic file to a second device associated with the destination information
804

SYSTEMS AND METHODS FOR MANAGING AND SECURING SENSITIVE ELECTRONIC FILES

BACKGROUND

Individuals receive numerous files (both physical and digital) from various entities, such as banks, government agencies, merchants, and the like, a large portion of which may include sensitive data (e.g., personally identifiable information, financial information, etc.).

BRIEF SUMMARY

Managing sensitive or otherwise important files (e.g., electronic documents and their physical counterparts) presents challenges for an individual due to the diverse sources from which these files originate and the necessity to access them through various applications, each of which may demand separate user accounts. Further, an individual may utilize numerous storage platforms (e.g., cloud storage platforms, virtual drives, physical hard disk drives, paper filing systems, etc.), as well as numerous devices (e.g., laptops, desktop computers, mobile phones, tablets, etc.), each of which may have its own means of storage. A challenge stems from these realities of modern life in that the fragmentation of information across disparate platforms makes it difficult to establish a coherent system for organization and retrieval of important files.

As files (e.g., financial documents, such as financial statements, receipts, invoices, tax forms, and the like) may originate from email attachments, cloud storage services, standalone software applications, and the like, users are compelled to navigate a complex web of logins, application installations, and interfaces. This not only strains cognitive and computational resources but also presents security concerns, because individuals must keep track of multiple username and password combinations, often resorting to insecure practices (e.g., reusing credentials). Consequently, maintaining the confidentiality and availability of these files becomes a substantial challenge, underscoring the need for more streamlined and secure methods of electronic file management across a digital landscape characterized by increasing complexity.

Further, in the context of financial documents, it may not always be clear to an individual as to the importance of saving any particular financial document. For instance, an individual may not think twice about saving a receipt associated with a charitable donation, even though that receipt may be utilized for tax purposes in the future. Even if the individual does remember to store the receipt when it is received, at tax season the individual may not recall that the receipt was stored or which storage platform holds the receipt.

To provide a solution for the issues discussed above, example embodiments described herein leverage the security and infrastructure of a mobile banking application to provide an electronic file inbox subsystem within the mobile banking application that serves as a central storage source for sensitive electronic files, such as financial documents and the like. In various embodiments, an electronic file management (EFM) system may automatically connect to and communicate with a plurality of remote data sources (e.g., external, third-party platforms) in order to automatically import electronic files stored on or otherwise managed by the remote data sources to the EFM system, such that the imported electronic files may be accessed by a user securely through the EFM system via, e.g., a mobile banking application installed on the user's personal device. In various embodiments, the EFM system may first classify an electronic file in order to determine whether to import or store the electronic file to the EFM system. For example, in some embodiments, only financially-related electronic files may be stored to the EFM system. In other embodiments, however, any electronic files associated with a particular user may be stored to the EFM system such that the electronic files are made accessible to the user via their mobile banking application. In various embodiments, the EFM system may also automatically configure the electronic file inbox in order to organize the electronic file inbox based on classifications of electronic files imported to the EFM system and in a manner that makes logical sense to a user. For instance, the EFM system, in some embodiments, may automatically (e.g., without user intervention) generate inboxes for specific classifications of electronic files. As one example, an inbox may be automatically generated to store tax-related documents (e.g., W-2 forms), while another inbox may be automatically generated to store healthcare-related documents (e.g., hospital bills).

In addition to storing electronic files, in some embodiments, the EFM system may also automatically reconcile line item transactions (e.g., of the mobile banking application) based on electronic files stored by the EFM system. For instance, purchase information indicated by purchase receipts, invoices, or similar electronic files may be compared to line item transactions indicated by the mobile banking application in order to confirm matching amounts. The EFM system may also modify a visualization of the line item transaction within the mobile banking application based on an outcome of the reconciliation.

In various embodiments, the EFM system may generate machine-readable indicia (e.g., a barcode, QR code, or the like) specifically linked to a particular sub-inbox. The machine-readable indicia, when scanned, may facilitate a transmission of one or more electronic files directly to the particular inbox. In various embodiments, the EFM system may cause display of the machine-readable indicia via the mobile banking application at a user device.

In various embodiments, the EFM system may perform contextual analysis based on current location data of a user device in order to determine a type of event the user may currently be involved in. The EFM system may determine that the event type corresponds to a predefined event type and, if so, cause presentation of a notification to the user regarding an electronic file which may or may not have been stored to the user's electronic file inbox. For example, the EFM system may determine that the user is attending an charity gala event, and may present a notification to the user to remind the user to store any physical receipts the user acquires from the event to the EFM system (e.g., such that the user may take advantage of tax write-offs at a later time).

Accordingly, the present disclosure sets forth systems, methods, and apparatuses that provide an efficient and effective solution for managing and securing electronic files. There are many advantages of these and other embodiments described herein. For instance, the EFM system centralizes crucial financial documents into a single, secure location which may be accessed any time and from anywhere. In this regard, a user need not maintain multiple cloud storage solutions, the use of which may lead to misplaced electronic files and put the user at greater risk for becoming a victim of a data breach. In addition, user privacy is maintained through the use of machine-readable indicia in place of personal contact information (e.g., an email address) when attempting to exchange an electronic file; for instance, the user may simply display a machine-readable indicia (e.g., a QR code) on their personal device to transfer the electronic file to a particular sub-inbox). In addition, the EFM system provides real-time context analysis and location awareness to identify situations in which a user may benefit from obtaining and storing an electronic file related to an event they are attending. In this regard, through user device prompts and notifications, a user is made readily aware of potential benefits of electronic files they may obtain through the particular event. Finally, the EFM system provides an automatic organization processes which logically order the electronic files into appropriate storage locations within the electronic file inbox, thereby automatically avoiding electronic file clutter and allowing a user to efficiently locate electronic files stored to the electronic file inbox.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 3 illustrates an example flowchart for managing and securing sensitive electronic files, in accordance with some example embodiments described herein.

DETAILED DESCRIPTION

Figure 1:
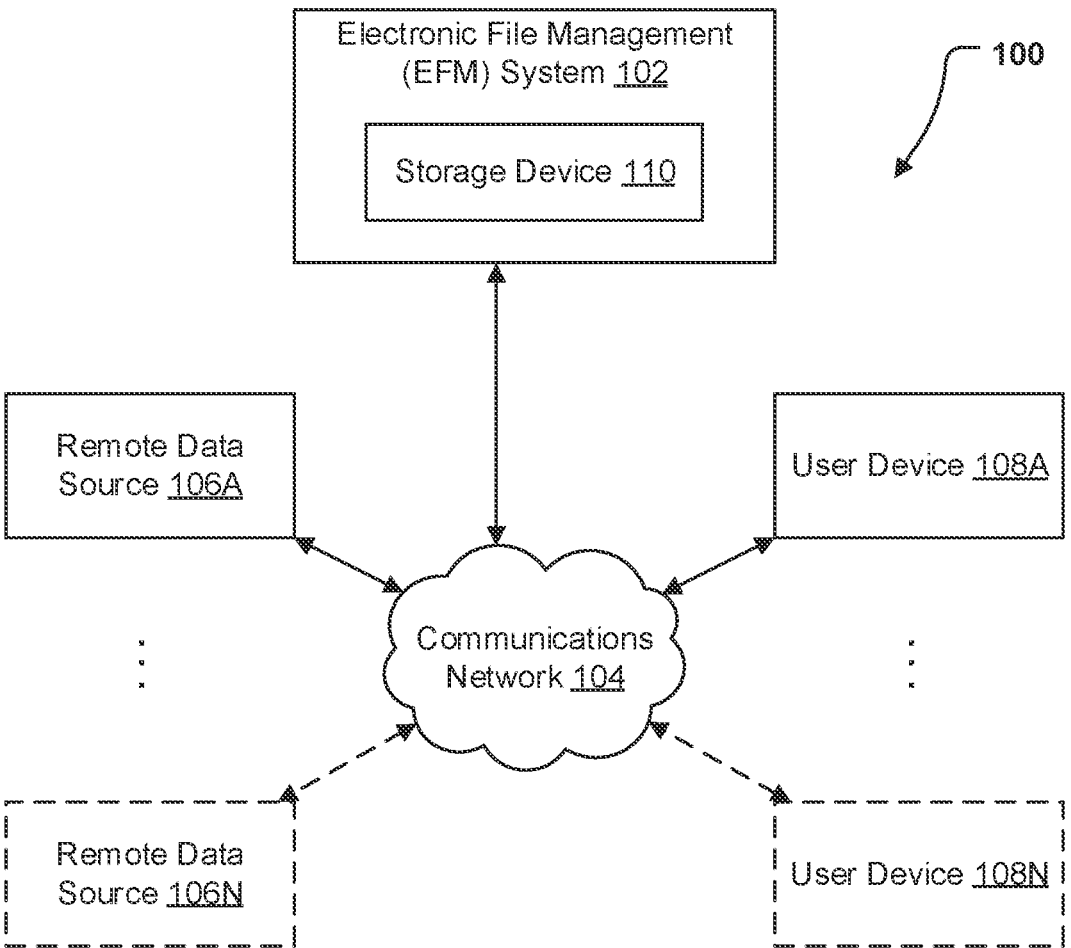
FIG. 1 illustrates a system in which some example embodiments may be used for managing and securing sensitive electronic files.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "mobile banking application" refers to a digital platform developed by one or more financial institutions that allows users to manage their financial activities and accounts conveniently through their personal user devices (e.g., smartphones, tablets, etc.). A mobile banking application combines a range of features to provide users with seamless access to banking services at any time. Through a mobile banking application, a user may perform various tasks, including (but not limited to) account management (e.g., viewing real-time account balances, line item transactions, transaction histories, and other information about their accounts), fund transfers, bill payments (e.g., including scheduling one-time or recurring payments), mobile check deposits (e.g., the mobile banking application may provide the capability to deposit checks by taking photos of the checks using the user device's camera), electronic file storage and management through an electronic file inbox (as discussed below), budgeting, investment management (e.g., monitor investment portfolios and execute stock trades), card management (e.g., freeze or unfreeze debit and/or credit cards and set spending limits), loan and credit applications, customer support (e.g., live chat or messaging with a customer service representative), currency conversion, and the like. A mobile banking application also provides enhanced security features. For instance, a mobile banking application may incorporate multiple security layers, including biometric authentication (e.g., facial recognition and/or fingerprint recognition), Personal Identification Numbers (PINs), and encryption to ensure the protection of sensitive financial data (e.g., sensitive electronic files).

In various embodiments, a mobile banking application may interact with a server (e.g., EFM system 102) to provide data to users via the mobile banking application. For instance, when a user performs an action within the mobile banking application, the mobile banking application may generate and send a request to the server (e.g., EFM system 102) that includes information about the specific action and may also include any authentication credentials of the user necessary for security. The server (e.g., EFM system 102) may then process the request and retrieve any requested data or perform requested actions. In response, the server may format certain data (e.g., retrieved data) into a structured format (e.g., JavaScript Object Notation (JSON), Extensible Markup Language (XML), and/or the like) which can be interpreted by the mobile banking application, provide the structured data to the mobile banking application which may then be displayed (e.g., via client-side processing) in a user-friendly format on an interface of the mobile banking application. In various embodiments, encryption may be used to secure data transmissions between the mobile banking application (e.g., installed on a user device) and the server (e.g., the EFM system 102)

The term "electronic file inbox" refers to a specialized feature within a mobile banking application that serves as a virtual repository for electronic files, messages, and other items related to a user's financial activities. The electronic file inbox may facilitate communication between a bank and the user (e.g., an account holder), offering a convenient and secure platform to exchange, store, and manage information. In various embodiments, a user may receive notifications, alerts, electronic files, and important updates directly in the electronic file inbox. The electronic file inbox also enables attachment and storage of various electronic files, such as transaction receipts, legal documents, contracts, bills, invoices, statements, and the like within the mobile banking application. The electronic file inbox thus provides an integrated and organized space where a user can manage their financial correspondence and documentation efficiently within the secure confines of their mobile banking application.

In various embodiments, an electronic file inbox may include multiple inboxes, which may also be referred to as "sub-inboxes" configured to store differently classified electronic files. Through multiple sub-inboxes, the electronic file inbox may provide a hierarchical structure that allows a user to compartmentalize electronic files based on different criteria and allows users to quickly locate specific types of files without having to sift through a cluttered, single inbox. Sub-inboxes provide enhanced visibility, efficient navigation, and reduced cognitive load by presenting information in a logical and predictable manner. Further, sub-inboxes improve searchability, reduce clutter, and provide a customizable and consistent workflow for organizing electronic files.

The term "machine-readable indicia" refers to visual or graphical elements embedded within a medium (either physical or virtual) that are configured to be scanned and interpreted by devices for the purpose of extracting encoded information. One example of machine-readable indicia is a barcode. The term "barcode" refers to a visual, machine-readable code that represents data. A barcode may comprise a linear (e.g., one-dimensional (1D)) barcode or a matrix (e.g., two-dimensional (2D)) barcode, such as, for example, a Quick Response (QR) code. A one-dimensional barcode is made up of lines and spaces of various widths or sizes that create specific patterns. A two-dimensional barcode is similar to a one-dimensional barcode but can represent more data per unit area. A barcode may be scanned and read by specialized scanning apparatuses that use optical sensors to detect patterns in the barcode, e.g., barcode readers. Certain barcodes, such as QR codes may be scanned and read by mobile smartphones.

When a barcode is scanned (or read), the scanning device emits a beam of light that illuminates the barcode. The light is reflected off of the lines and spaces in the barcode, and the reflected light is detected by a photosensor in the scanning device. The photosensor may then convert the pattern into an electrical signal, which is then processed by a decoder of the scanning device. The decoder may interpret the electrical signal and identify data that the barcode represents. This information can be used to perform a variety of functions, depending on the application. For example, as discussed herein, scanning a barcode may facilitate a transmission of at least one electronic file to the storage location for storage. One of the key advantages of barcodes is their speed and accuracy. Due to the automation of the scanning process, barcodes can be read more efficiently and accurately than manually entering information into a computer system. This saves time and reduces potential human errors.

System Architecture

Example embodiments described herein may be implemented using any of a variety of computing devices or servers. To this end, FIG. 1 illustrates an example environment 100 within which various embodiments may operate. As illustrated, an electronic file management (EFM) system 102 may receive and/or transmit information via communications network 104 (e.g., the Internet) with any number of other devices, such as one or more of remote data sources 106A-106N and/or user devices 108A-108N.

The EFM system 102 may be implemented as one or more computing devices or servers, which may be composed of a series of components. Particular components of the EFM system 102 are described in greater detail below with reference to apparatus 200 in connection with FIG. 2.

In some embodiments, the EFM system 102 further includes a storage device 110 that comprises a distinct component from other components of the EFM system 102. Storage device 110 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Storage device 110 may host the software executed to operate the EFM system 102. Storage device 110 may store information relied upon during operation of the EFM system 102, such as various machine-readable indicia, machine learning (ML) models, and/or the like that may be used by the EFM system 102, electronic files and other data to be analyzed using the EFM system 102, and/or the like. In addition, storage device 106 may store control signals, device characteristics, and access credentials enabling interaction between the EFM system 102 and one or more of the remote data sources 106A-106N or user devices 108A-108N.

The one or more remote data sources 106A-106N and the one or more user devices 108A-108N may be embodied by any computing devices known in the art. The one or more remote data sources 106A-106N and the one or more user devices 108A-108N need not themselves be independent devices, but may be peripheral devices communicatively coupled to other computing devices.

Example Implementing Apparatuses

Figure 2:
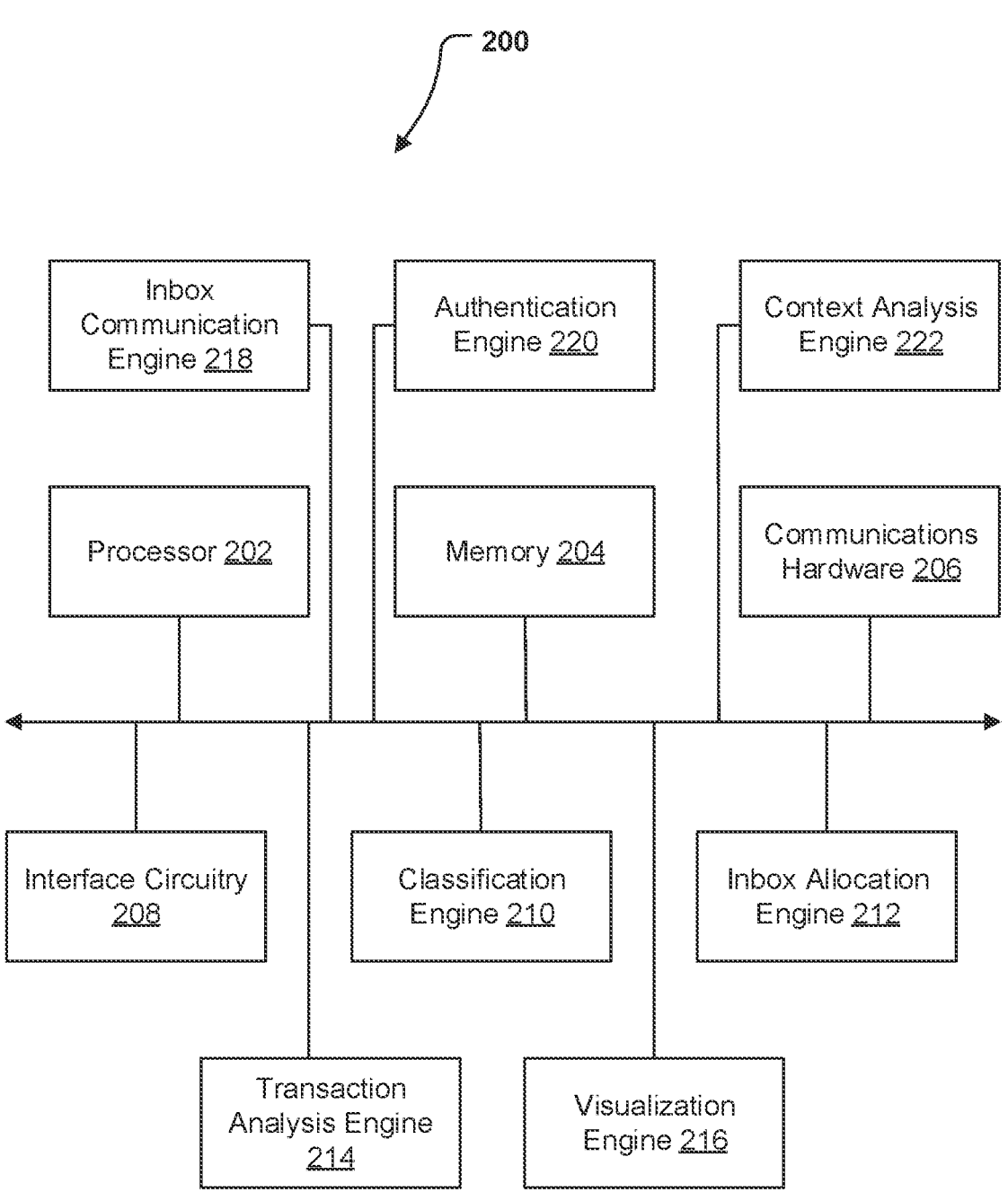
FIG. 2 illustrates a schematic block diagram of example circuitry embodying a system device that may perform various operations in accordance with some example embodiments described herein.

The EFM system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-8. As illustrated in FIG. 2, the apparatus 200 may include processor 202, memory 204, communications hardware 206, interface circuitry 208, classification engine 210, inbox allocation engine 212, transaction analysis engine 214, visualization engine 216, inbox communication engine 218, authentication engine 220, and context analysis engine 222, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises interface circuitry 208 that obtains electronic files associated with third-party applications (e.g., from remote data sources 106A-106N). The interface circuitry 208 may utilize processor 202, memory 204, or any other hardware component included in the apparatus 200 to perform these operations, as described in connection with FIG. 3 below. The interface circuitry 208 may further utilize communications hardware 206 to gather data from a variety of sources (e.g., remote data sources 106A-106N, user devices 108A-108N, and/or storage device 110, as shown in FIG. 1), and/or exchange data with a user. In various embodiments, the interface circuitry 208 may comprise Application Programming Interface (API) functionality to facilitate seamless communication between distinct applications with the primary objective of retrieving electronic files. In this regard, the interface circuitry 208 may employ standardized protocols and data structures to establish efficient and secure channels with third-party applications. For instance, the EFM system 102 may generate API request (e.g., via interface circuitry 208) specifying desired actions and parameters (e.g., electronic file retrieval). The interface circuitry 208 may then communicate with a target application (e.g., via a remote data source 106A-106N) and, in response, receive one or more electronic files (e.g., in a standardized format). In various embodiments, the EFM system 102, by way of a mobile banking application installed on a user device, may communicate with other applications installed on the user device (e.g., via servers (such as remote data sources) which manage or are otherwise associated with those applications) to obtain electronic files from those applications. Example applications from which the EFM system 102 may obtain electronic files may include (but are not limited to) other mobile banking applications or financial applications, email applications, messaging applications (e.g., Short Messaging Service (SMS) text applications), social media applications, cloud storage service applications, camera applications, photo storage applications, and similar applications. In general, the EFM system 102 may connect to and obtain electronic files from (e.g., via interface circuitry 208) any application configured to store electronic files.

In addition, the apparatus 200 further comprises a classification engine 210 that determines classifications for electronic files. Said differently, the classification engine 210 may classify electronic files, e.g., according to one or more predefined classifications. The classification engine 210 may utilize processor 202, memory 204, or any other hardware component included in the apparatus 200 to perform these operations, as described in connection with FIGS. 3 and 4 below. The classification engine 210 may further utilize interface circuitry 208 and/or communications hardware 206 to gather data from a variety of sources (e.g., remote data sources 106A-106N, user devices 108A-108N, and/or storage device 110, as shown in FIG. 1), and/or exchange data with a user, and in some embodiments may utilize processor 202 and/or memory 204 to determine a first classification and a second classification for an electronic file. In various embodiments, the classification engine 210, in order to determine a classification of an electronic file, may identify whether keywords of a predefined keyword set are present within the electronic file and determine a confidence score for the electronic file based on identified keywords within the electronic file. For example, in some embodiments, the classification engine 210 may first classify an electronic file as a financial electronic file (e.g., an electronic file relates to financial information regarding a user) or a non-financial electronic file (e.g., an electronic file that does not relate to financial information regarding a user). In some embodiments, in order to classify an electronic file, the classification engine 210 may utilize one or more natural language processing (NLP) techniques in order to extract information such as terms and/or values present within an electronic file, such as in the context of a document file (e.g., a PDF or the like). For example, the classification engine 210 may pre-process an electronic file by removing punctuation and/or other elements. The classification engine 210 may then perform a tokenization operation on the preprocessed electronic file to identify individual terms (e.g., tokens). The classification engine 210 may then process the identified terms in connection with the predefined keyword set as discussed above.

In some embodiments, the classification engine 210 may utilize one or more machine learning (ML) models and/or artificial intelligence techniques to determine a classification for an electronic file. For example, in some embodiments, the classification engine 210 may process an electronic file using a trained ML model (or multiple ML models) to determine a confidence score representing a likelihood that the electronic file corresponds to a particular classification. For example, a confidence score meeting or exceeding a predefined threshold may indicate that the electronic file is likely to be a financial electronic file, whereas a confidence score failing to meet or exceed the predefined threshold may indicate that the electronic file is likely a non-financial electronic file. In some embodiments, the model may be trained using labeled data in the form of historical electronic files known to be financial electronic files (as well as historical electronic files known to be non-financial electronic files). In this regard, the model may be trained in a supervised manner in order for the model to accurately identify, via a confidence score, whether an electronic file is a financial electronic file or non-financial electronic file.

In some embodiments, in addition to classifying an electronic file as a financial electronic file or non-financial electronic file, the classification engine 210 may also determine additional classifications for an electronic file. For example, for a financial electronic file, the classification engine 210 may further classify the financial electronic file as a particular type of financial electronic file (e.g., a tax-related electronic file, healthcare-related electronic file, a purchase receipt, etc.). To do so, classification engine 210 may employ similar methods as discussed above (e.g., NLP and/or machine learning techniques).

Further, the apparatus 200 further comprises an inbox allocation engine 212 that selects storage locations for electronic files within an electronic file inbox of a mobile banking application and stores electronic files in association with storage locations. In various embodiments, the inbox allocation engine 212 may select a storage location based on a classification of an electronic file. In some embodiments, the inbox allocation engine 212 may select an existing storage location (e.g., an existing inbox) or generate a new storage location (e.g., a new inbox) within the electronic file inbox based, e.g., on a classification of the electronic file. The inbox allocation engine 212 may utilize processor 202, memory 204, or any other hardware component included in the apparatus 200 to perform these operations, as described in connection with FIG. 3 below. The inbox allocation engine 212 may further utilize communications hardware 206 to gather data from a variety of sources (e.g., remote data sources 106A-106N, user devices 108A-108N, and/or storage device 110, as shown in FIG. 1) and/or exchange data with a user.

Further, the apparatus 200 further comprises a transaction analysis engine 214 that reconciles line item transactions of the mobile banking application based on one or more electronic files (e.g., which are stored in connection with the electronic file inbox of the mobile banking application). The transaction analysis engine 214 may utilize processor 202, memory 204, visualization engine 216, or any other hardware component included in the apparatus 200 to perform these operations, as described in connection with FIG. 3 below. In various embodiments, the transaction analysis engine 214 may reconcile a line item transaction based on electronic file through a comparison of information related to the line item transaction with information related to the electronic file. For instance, the transaction analysis engine 214 may determine a match between a payment amount indicated by a line item transaction and a payment amount indicated by an electronic file. In addition to payment amounts, the transaction analysis engine 214 may also determine matches or similarities between vendor names, dates, times, or other information indicated by the line item transaction and the electronic file. In various embodiments, in response to a successful reconciliation, the transaction analysis engine 214 may leverage communications hardware 206 and/or visualization engine 216 to cause display of an indication of a successful verification of a line item transaction (as further discussed below). In various embodiments, the transaction analysis engine 214 may continuously attempt to reconcile transactions in response to any addition of or modification to electronic files in the electronic file inbox of the mobile banking application. The transaction analysis engine 214 may further utilize communications hardware 206 to gather data from a variety of sources (e.g., remote data sources 106A-106N, user devices 108A-108N, and/or storage device 110, as shown in FIG. 1) and/or exchange data with a user.

Further, the apparatus 200 further comprises visualization engine 216 that modifies visualizations of data presented within a mobile banking application. For example, in some embodiments, the visualization engine 216 may modify a visualization of a line item transaction within the mobile banking application (e.g., in response to a successful or unsuccessful reconciliation of the line item transaction by the transaction analysis engine 214). For example, in some embodiments, the visualization engine 216 may modify a visualization of a line item transaction by altering a color of the visualization of the line item transaction and/or displaying a graphical icon representing a successful (or unsuccessful) reconciliation of the line item transaction in the visualization of the line item transaction (e.g., modifying a predefined area of the mobile banking application's user interface in which the line item transaction is displayed). To do so, the visualization engine 216 may generate the required visualization (e.g., a color change or graphical icon) in a standardized format (e.g., JSON, XML, an image, etc.) and cause transmission of visualization to the mobile application (e.g., at the user device), in order to modify a view of the mobile banking application's user interface to include the generated visualization. The visualization engine 216 may utilize processor 202, memory 204, communications hardware 206, transaction analysis engine 214, or any other hardware component included in the apparatus 200 to perform these operations, as described in connection with FIG. 3 below. The visualization engine 216 may further utilize communications hardware 206 to gather data from a variety of sources (e.g., remote data sources 106A-106N, user devices 108A-108N, and/or storage device 110, as shown in FIG. 1) and/or exchange data with a user.

Further, the apparatus 200 further comprises an inbox communication engine 218 that generates (e.g., automatically or in response to a request) machine-readable indicia for a storage location (e.g., the electronic file inbox or one or more sub-inboxes) that, when scanned by a scanning device, is configured to facilitate a transmission of at least one electronic file to the storage location. For example, in some embodiments, the inbox communication engine 218 may generate a barcode by encoding data (e.g., data based on a storage location) into a specific pattern of bars (and/or other shapes) and spaces using a barcode encoding algorithm. The barcode encoding algorithm may convert data (e.g., storage location information) into a binary code, which may then be converted into the specific pattern that can be scanned by a scanning device or similar barcode reader. The inbox communication engine 218 may also generate an image of the barcode, which can be displayed, e.g., via a screen of a user device by way of the mobile banking application. The inbox communication engine 218 may utilize processor 202, memory 204, or any other hardware component included in the apparatus 200 to perform these operations, as described in connection with FIG. 5 below. The inbox communication engine 218 may further utilize communications hardware 206 to gather data from a variety of sources (e.g., remote data sources 106A-106N, user devices 108A-108N, and/or storage device 110, as shown in FIG. 1) and/or exchange data with a user.

Further, the apparatus 200 further comprises an authentication engine 220 that requests and/or validates authentication data. In some embodiments, the authentication engine 220 may request authentication data of a user in response to, e.g., an electronic file display request (e.g., a request to display an electronic file on a screen of a user device via the mobile banking application). In some embodiments, the authentication engine 220 may request authentication data of a user in response to other requests or actions, such as in response to the user opening and/or attempting to access the mobile banking application, attempting to export, upload, or otherwise manage one or more electronic files of the electronic file inbox of the mobile banking application, and/or the like. In some embodiments, the authentication engine 220 may validate authentication data by comparing user-supplied authentication data with stored authentication data associated with the user. For example, the authentication engine 220 may verify that authentication data (e.g., a user credential) submitted in response to a request matches or shares enough similarity to a stored credential associated with the user (e.g., the stored credential being a credential initially supplied by the user during registration or the like at an earlier time). In some embodiments, such as instances in which the authentication data includes a biometric marker (e.g., a fingerprint), the authentication engine 220 may confirm that the submitted biometric marker shares enough similarities to a stored biometric marker to satisfy a predefined similarity threshold. For example, the authentication engine 220 may preprocess the submitted biometric marker (e.g., to remove noise, inconsistencies, or the like) and compare the preprocessed biometric marker to the stored biometric marker using a matching algorithm, such as minutiae-based matching or pattern matching. A resulting match score may then be compared with a predefined similarity threshold. In some embodiments, if the match score exceeds the predefined similarity threshold, the authentication data may be successfully validated. The authentication engine

220 may utilize processor 202, memory 204, or any other hardware component included in the apparatus 200 to perform these operations, as described in connection with FIG. 6 below. The authentication engine 220 may further utilize communications hardware 206 to gather data from a variety of sources (e.g., remote data sources 106A-106N, user devices 108A-108N, and/or storage device 110, as shown in FIG. 1) and/or exchange data with a user.

Further, the apparatus 200 further comprises a context analysis engine 222 that determines contextual information, such as an event type, related to a current location of a user device. The context analysis engine 222 may utilize processor 202, memory 204, or any other hardware component included in the apparatus 200 to perform these operations, as described in connection with FIG. 7 below. In some embodiments, as discussed below, the context analysis circuitry may utilize one or more ML models to determine an event type based on provided location data. The context analysis engine 222 may further utilize communications hardware 206 to gather data from a variety of sources (e.g., remote data sources 106A-106N, user devices 108A-108N, and/or storage device 110, as shown in FIG. 1) and/or exchange data with a user.

Although components 202-222 are described in part using functional language, it will be understood that the particular implementations necessarily include the use of particular hardware. It should also be understood that certain of these components 202-222 may include similar or common hardware. For example, the interface circuitry 208, classification engine 210, inbox allocation engine 212, transaction analysis engine 214, visualization engine 216, inbox communication engine 218, authentication engine 220, and context analysis engine 222 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "engine" and "circuitry" with respect to elements of the apparatus therefore shall be interpreted as necessarily including the particular hardware configured to perform the functions associated with the particular element being described. Of course, while the terms "engine" and "circuitry" should be understood broadly to include hardware, in some embodiments, the terms "engine" and "circuitry" may in addition refer to software instructions that configure the hardware components of the apparatus 200 to perform the various functions described herein.

Although the interface circuitry 208, classification engine 210, inbox allocation engine 212, transaction analysis engine 214, visualization engine 216, inbox communication engine 218, authentication engine 220, and context analysis engine 222 may leverage processor 202, memory 204, or communications hardware 206 as described above, it will be understood that any of interface circuitry 208, classification engine 210, inbox allocation engine 212, transaction analysis engine 214, visualization engine 216, inbox communication engine 218, authentication engine 220, and context analysis engine 222 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that interface circuitry 208, classification engine 210, inbox allocation engine 212, transaction analysis engine 214, visualization engine 216, inbox communication engine 218, authentication engine 220, and context analysis engine 222 comprise particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. For instance, some components of the apparatus 200 may not be physically proximate to the other components of apparatus 200. Similarly, some or all of the functionality described herein may be provided by third party circuitry. For example, apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Turning to FIGS. 3-8, example flowcharts are illustrated that contain example operations implemented by example embodiments described herein. The operations illustrated in FIGS. 3-8 may, for example, be performed by a system device of the EFM system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, interface circuitry 208, classification engine 210, inbox allocation engine 212, transaction analysis engine 214, visualization engine 216, inbox communication engine 218, authentication engine 220, context analysis engine 222, and/or any combination thereof. It will be understood that user interaction with the EFM system 102 may occur directly via communications hardware 206, or may instead be facilitated by a separate user device (e.g., any of user devices 108A-108N as shown in FIG. 1), and which may have similar or equivalent physical componentry facilitating such user interaction.

Turning first to FIG. 3, example operations are shown for managing and securing sensitive electronic files.

As shown by operation 302, the apparatus 200 includes means, such as processor 202, memory 204, communications hardware 206, interface circuitry 208, and/or the like, for obtaining an electronic file associated with a third-party application. In some embodiments, the electronic file may be associated with a third-party application in that the electronic file is obtained from the third-party application. For instance, a third-party application may store the electronic file, at least temporarily, such that interface circuitry 208 may connect with the third-party application (e.g., via an API as discussed above) and retrieve the electronic file. For example, the third-party application may be an email application wherein the electronic file is stored as an attachment to an email. As another example, the third-party application may be a secondary mobile banking application (e.g., a mobile banking application related to a retirement (e.g., 401k) account) which includes functionality to store electronic files. As another example, the third-party application may be a camera application on a user device with which a user has taken a photograph of physical financial document or the like.

In some embodiments, the interface circuitry 208 may automatically obtain the electronic file, e.g., through automatic API calls to one or more third-party applications installed on a user device. For example, the interface circuitry 208 may regularly (e.g., at predefined time intervals) communicate (e.g., via API calls) to one or more third-party applications in order to retrieve electronic files not yet processed by the EFM system 102. In some embodiments, the interface circuitry 208 may obtain the electronic file in response to user interaction, such as a request made by the user via the mobile banking application to retrieve one or more electronic files from one or more third-party applications. In some embodiments, a user may upload an electronic file stored on their user device (e.g., in a photos application) directly to the mobile banking application such that the interface circuitry 208 may obtain the electronic file through the upload.

Figure 4:
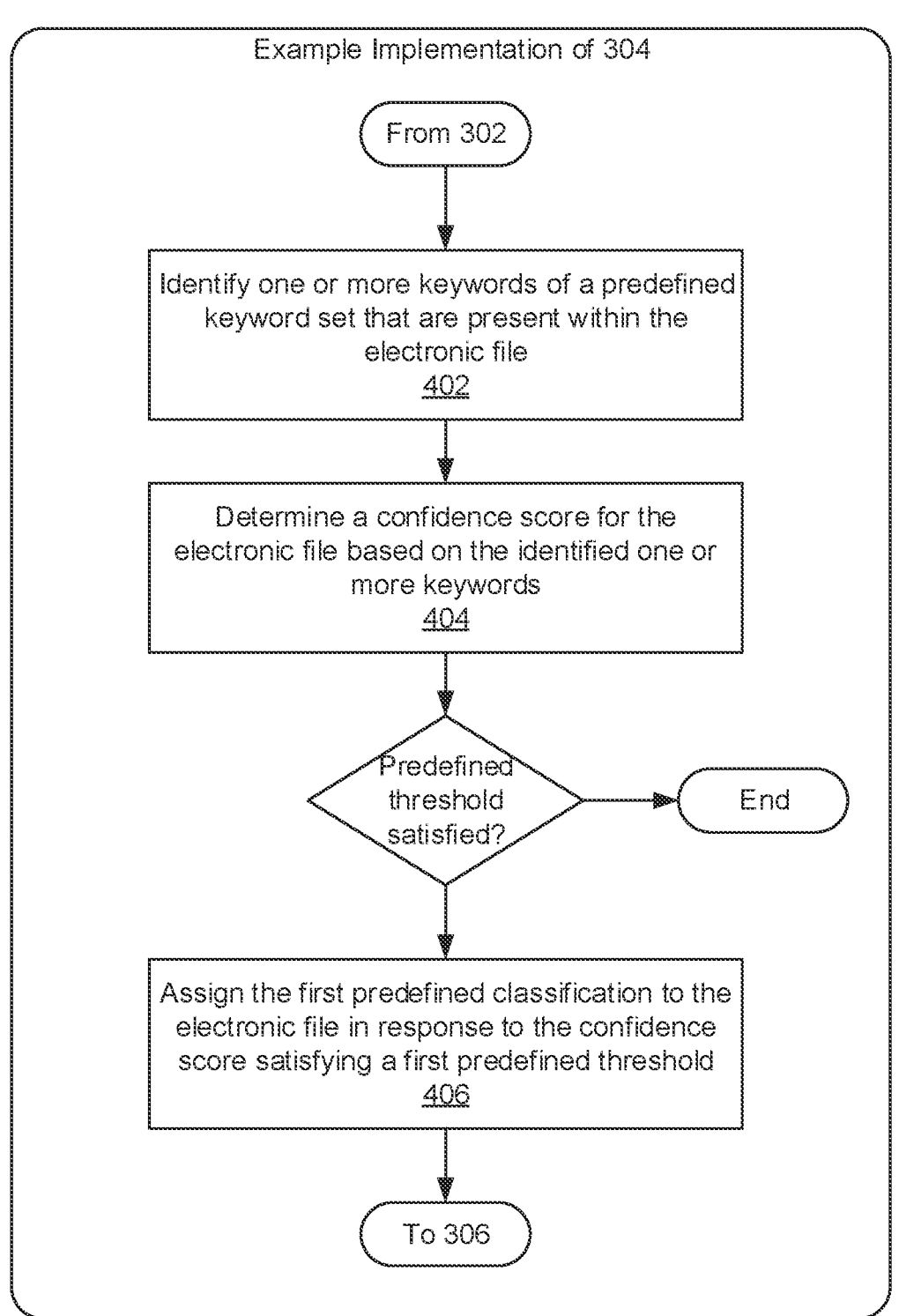
FIG. 4 illustrates an example flowchart for determining a classification of an electronic file, in accordance with some example embodiments described herein.

In response to obtaining an electronic file, the EFM system 102 may then classify the electronic file. In this regard, as shown by operation 304, the apparatus 200 includes means, such as processor 202, memory 204, communications hardware 206, classification engine 210, and/or the like, for determining a first classification of the electronic file. In some embodiments, the determination of the first classification may comprise a determination as to whether the electronic file should be classified as a financial electronic file or a non-financial electronic file, which may inform a greater decision as to whether to store the electronic file in association with the electronic file inbox. For example, in some embodiments, the EFM system 102 may operate to only store financial electronic files in association with the electronic file inbox (such that a user is provided with a central source of all financial electronic documents via their mobile banking application). In this manner, an electronic file classified as a non-financial electronic file may be ignored by the EFM system 102 and not stored in association with the electronic file inbox. Turning briefly to FIG. 4, example operations are shown for determining a classification of an electronic file.

As shown by operation 402, the apparatus 200 includes means, such as processor 202, memory 204, communications hardware 206, classification engine 210, and/or the like, for identifying one or more keywords of a predefined keyword set that are present within the electronic file. In some embodiments, the classification engine 210 may determine whether one or more keywords of a predefined keyword set are present within the electronic file by utilizing a machine learning (ML) model or the like to determine whether an electronic file is a financial electronic file or a non-financial electronic file. For example, the content analysis engine 208 may utilize a model which has been trained using historical electronic files. In this regard, labeled training data in the form of historical content requiring a required disclosure may be used to train the model in a supervised manner such that the model can output a confidence score that represents a likelihood that an electronic file is a financial electronic file. In some embodiments, for example, the confidence score may correspond to a number of keywords of a predefined keyword set identified within the electronic file. In this regard, a higher number of keywords identified may correspond to a higher confidence score. In this regard, as shown by operation 404, the apparatus 200 includes means, such as processor 202, memory 204, classification engine 210, and/or the like, determining a confidence score for electronic file based on the identified one or more keywords. For example, the confidence score may comprise a value between 0 and 1, which a value closer to 1 indicating a higher likelihood that the electronic file is a financial electronic file. In some embodiments, the classification engine 210 may compare the confidence score to a predefined threshold to determine whether the confidence score satisfies the predefined threshold. For example, if a confidence score meets or exceeds 0.6, the classification engine 210 may classify the electronic file as a financial electronic file. In this regard, as shown in FIG. 4, if the predefined threshold is satisfied, the method may continue to operation 406, wherein the apparatus 200 includes means, such as processor 202, memory 204, classification engine 210, and/or the like, for assigning a first predefined classification to the electronic file in response to the confidence score satisfying a first predefined threshold. For example, the first predefined classification may correspond to a classification of a financial electronic file. Continuing with the example above, if a probability score falls below 0.6, the classification engine 210 may classify the electronic file as a non-financial electronic file (or, in some embodiments, simply disregard the electronic file as not relevant for storing in association with an electronic file inbox).

Returning to FIG. 3, as shown, if the classification of the electronic file does not correspond to a first predefined classification (e.g., the electronic file is not classified as a financial electronic file), the method may return to operation 302, wherein another electronic file is obtained and subsequently classified by the EFM system 102. In this regard, in some embodiments, the EFM system 102 may disregard non-financial electronic files and only continue to process (and store) financial electronic files. However, it is to be appreciated that in some embodiments, the EFM system 102 may also store non-financial electronic files in addition to financial electronic files (e.g., the EFM system 102 may store all electronic files pertaining to a particular user in association with the user's electronic file inbox).

As shown in FIG. 3, if the first classification of the electronic file corresponds to the first predefined classification (e.g., if the electronic file is classified as a financial electronic file), the method may continue to operation 306, wherein the apparatus 200 includes means, such as processor 202, memory 204, classification engine 210, and/or the like, for determining a second classification of the electronic file. In some embodiments, for example, when the electronic file is classified as a financial electronic file, the classification engine 210 may then perform another classification of the financial electronic file in order to classify the financial electronic file as a particular type of financial electronic file, and the second classification may then be leveraged to by the EFM system 102 to select a storage location for the financial electronic file that is most suited for its particular type. For example, the classification engine 210 may first classify the electronic file as a financial electronic file, and then may classify the financial electronic file as a tax document. As another example, the classification engine 210 may first classify the electronic file as a financial electronic file, and then may classify the financial electronic file as a charitable donation receipt. As yet another example, the classification engine 210 may first classify the electronic file as a financial electronic file, and then may classify the financial electronic file as a purchase receipt.

The classification engine 210 may determine the second classification in a similar manner as the determination of the first classification. For example, in some embodiments, the classification engine 210 may utilize the same ML model used for the first classification or one or more additional ML models to determine the second classification. For example, in some embodiments, the classification engine 210 may utilize a suite of ML models, each trained to output a confidence score that an electronic file corresponds to a respective type of financial electronic file. Each of the ML models may be trained using labeled training data comprising a set of financial electronic files of a respective type such that each ML model may learn keywords and other attributes of those financial electronic files and apply a confidence score to a given electronic file that represents a likelihood that the electronic file corresponds to that type. In this regard, the classification engine 210 may provide the financial electronic file as input to a plurality of trained ML models and determine, for example, the second classification based on the highest confidence score output by the models.

As shown by operation 308, the apparatus 200 includes means, such as processor 202, memory 204, inbox allocation engine 218, and/or the like, for selecting, based on the second classification of the electronic file, a first storage location associated with an electronic file inbox of a mobile banking application. For example, the inbox allocation engine 218 may select a sub-inbox corresponding to the financial electronic file type (i.e., the second classification) as a storage location for the financial electronic file. As one example, if the classification engine 210 determined that the financial electronic file is a tax document, the inbox allocation engine 218 may select a tax document sub-inbox as a storage location for the financial electronic file. As another example, if the classification engine 210 determined that the financial electronic file is a purchase receipt, the inbox allocation engine 218 may select a purchase receipt sub-inbox as a storage location for the financial electronic file.

In some embodiments, selecting the first storage location may comprise automatically generating the first storage location. For example, if the classification engine 210 determined that the financial electronic file is a charitable donation receipt, the inbox allocation engine 218 may automatically generate a new sub-inbox for charitable donation receipts in the event a sub-inbox for charitable donation receipts had not yet been generated. In this regard, the apparatus 200 includes means, such as processor 202, memory 204, inbox allocation engine 218, and/or the like, for automatically generating, based on the second classification, a first storage location associated with an electronic file inbox of a mobile banking application.

In some embodiments, the inbox allocation engine 218 may further select, or automatically generate, another storage location within the selected first storage location. For example, in the example of a tax documents sub-inbox, the tax documents sub-inbox may contain a plurality of folders which organize tax documents by year. For instance, an example tax documents sub-inbox may contain folders for 2020, 2021, 2022, and 2023. In this regard, the inbox allocation engine 218 may leverage keywords identified by the classification engine 218 in its classification of the electronic file to select a suitable storage location. For instance, the classification engine 210 may have classified the financial electronic file as a tax document, and also identified (e.g., through parsing of text) a date (e.g., "2023") included in the electronic file. The inbox allocation 218 may leverage this information to then select the "2023" folder within the tax documents sub-inbox as the first storage location for the financial electronic file.

As shown by operation 310, the apparatus 200 includes means, such as processor 202, memory 204, inbox allocation engine 218, and/or the like, for storing the electronic file in association with the first storage location. In this regard, once stored, a user may be able to access the electronic file by navigating to the first storage location in their electronic file inbox of their mobile banking application.

In some embodiments, the EFM system 102 may automatically reconcile line item transactions of the mobile banking application based on an electronic file (or multiple electronic files). In this regard, as shown by operation 312, the apparatus 200 includes means, such as processor 202, memory 204, transaction analysis engine 214, and/or the like, for reconciling a line item transaction of the mobile banking application based on the electronic file. For example, within a user's mobile banking application, a plurality of line item transactions may be rendered as the user conducts transactions at various (physical or virtual) locations. The EFM system 102 may automatically obtain an electronic file that includes a purchase receipt which corresponds to a recent line item transaction. For example, the EFM system 102 may connect (e.g., via interface circuitry 208) to an email application on the user's device and obtain the purchase receipt (which was emailed to them by a merchant). The EFM system 102 may then reconcile the purchase by confirming purchase amounts indicated by the purchase receipt and the line item transaction match (e.g., to ensure the user was not overcharged for the purchase). In this regard, the apparatus 200 includes means, such as processor 202, memory 204, transaction analysis engine 214, and/or the like, for determining a match between a payment amount indicated by the line item transaction and a payment amount indicated by the electronic file. To do so, the transaction analysis engine 214 may leverage prior performance parsing or other text extraction techniques performed by classification engine 210 on a plurality of electronic files stored in association with the electronic file inbox to identify an electronic file containing the purchase amount and subsequently confirm the purchase amount matches the purchase amount of the line item transaction. In some embodiments, as purchase amounts may be repeated at various merchants, the transaction analysis engine 214 may also confirm a match (or enough similarity) between one or more attributes (e.g., a vendor name, date, time, and/or the like) indicated by the line item transaction and electronic match in addition to the purchase amount.

In some embodiments, the EFM system 102 may communicate a successful or unsuccessful reconciliation of a line item transaction to a user via a visualization in the mobile banking application. In this regard, the apparatus 200 includes means, such as processor 202, memory 204, communications hardware 206, visualization engine 216, and/or the like, for causing display of an indication of a successful or unsuccessful reconciliation of a line item transaction. In some embodiments, for example, the visualization engine 216 may modify a visual aesthetic of a particular line item transaction to reflect the successful or unsuccessful reconciliation. In this regard, the apparatus 200 includes means, such as processor 202, memory 204, visualization engine 216, and/or the like, for modifying a visualization of a line item transaction within the mobile banking application. For instance, in some embodiments, modifying a visualization of a line item transaction may comprise altering a color of the visualization of the line item transaction. For example, in response to a successful reconciliation, the visualization engine 216 may alter a background color of the line item transaction to green, and, in response to an unsuccessful reconciliation, the visualization engine 216 may alter a background color of the line item transaction to red. In some embodiments, for line item transactions not yet reconciled, the visualization engine 216 may alter a background color of those line item transactions to yellow. Additionally or alternatively, in some embodiments, modifying a visualization of a line item transaction may comprise displaying a graphical icon representing the successful or unsuccessful reconciliation of the line item transaction in a visualization of a line item transaction. For example, a graphical icon, such as an image of a green check mark, may be displayed adjacent to or within the visualization of the line item transaction (e.g., next to the purchase amount) in an instance in which the line item transaction is successfully reconciled. As another example, a graphical icon, such as a red "X" or similar mark, may be displayed adjacent to or within the visualization of the line item transaction (e.g., next to the purchase amount) in an instance in which the line item transaction is not successfully reconciled.

Figure 5:
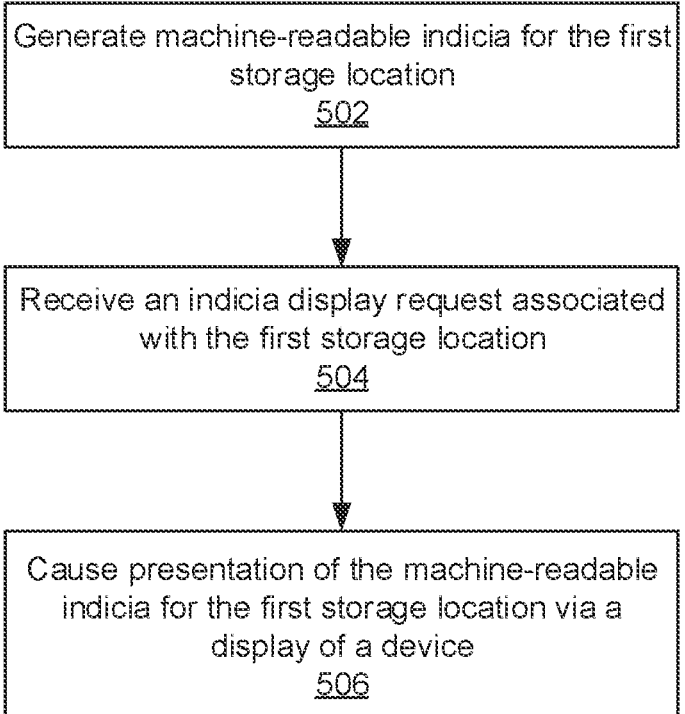
FIG. 5 illustrates an example flowchart for generating and utilizing machine-readable indicia, in accordance with some example embodiments described herein.

In some embodiments, the EFM system 102 may generate machine-readable indicia for storage locations (e.g., sub-inboxes) of the electronic file inbox in order to facilitate transmission and storage of electronic files to the storage locations. Turning to FIG. 5, example operations are shown for generating and utilizing machine-readable indicia.

As shown by operation 502, the apparatus 200 includes means, such as processor 202, memory 204, inbox communication engine 218, and/or the like, for generating machine-readable indicia for a first storage location.

In some embodiments, as discussed above, machine-readable indicia may comprise a barcode, such as a QR code, that (when scanned) instructs other devices to transmit electronic file(s) to a specific storage location (e.g., a sub-inbox, or multiple sub-inboxes) within the user's electronic file inbox of their mobile banking application. In some embodiments, QR codes may be generated automatically by the inbox communication engine 218, e.g., in response to a generation of a sub-inbox. Said differently, each time a sub-inbox is newly generated (either automatically or directly by a user), the inbox communication engine 218 may automatically generate a QR code specifically for that sub-inbox. In other embodiments, the inbox communication engine 218 may generate QR codes (or other types of machine-readable indicia) in response to a user request. For example, a user may request, via their mobile banking application, QR codes be generated only for specific sub-inboxes.

To generate a QR code, the inbox communication engine 218 may select a sub-inbox identifier. In some embodiments, each sub-inbox generated by the EFM system 102 may be associated with a sub-inbox identifier, which may be a unique code representing the sub-inbox. Using the sub-inbox identifier and additional instructions (e.g., for sending electronic files), the inbox communication engine 218 may generate a data payload comprising, e.g., a structured text string that includes the sub-inbox identifier and instructions. The inbox communication engine 218 may then utilize a QR code generation library and/or QR code generation algorithm to generate a QR code image based on the data payload. In this regard, when another device scans the generated QR code, the encoded data payload is extracted from the QR code image and decoded, such that the device can initiate transmission of electronic files to the specified sub-inbox.

As shown by operation 504, the apparatus 200 includes means, such as processor 202, memory 204, inbox communication engine 218, and/or the like, for receiving an indicia display request associated with the first storage location. For example, a user may, through their mobile banking application, provide the indicia display request by selecting a graphical button or the like to display the QR code for a particular sub-inbox. As shown by operation 506, the apparatus 200 includes means, such as processor 202, memory 204, communications hardware 206, and/or the like, for causing presentation of the machine-readable indicia for the first storage location via a display of a device. For instance, the QR code may be displayed via a display screen of a user device (e.g., via the mobile banking application) in order for another device (e.g., a scanning device, another user device, a merchant point-of-sale (POS) device, and/or the like) may scan the QR code in order to facilitate a transmission of one or more electronic files to a particular sub-inbox.

In some embodiments, QR codes and/or other machine-readable indicia generated by the inbox communication engine 218 may be generated to be one-time-use machine readable indicia. For example, during generation of a QR code, the inbox communication engine 218 may implement an expiry mechanisms to the QR code. In some embodiments, for example, after the QR code is scanned and electronic file(s) are transmitted and stored to the sub-inbox, the inbox communication engine 218 may mark the QR code as used and set the QR code to expire, such that electronic file transmission to the sub-inbox will not be possible in response to a subsequent scanning of the QR code.

Through utilizing machine-readable indicia to facilitate transmission of electronic files to a designated sub-inbox, several advantages are realized. First, a user can avoid providing personal contact information to an entity in order to obtain an electronic file. For example, when present at a merchant device upon making a purchase, rather than provide the merchant with their personal email address to have a purchase receipt emailed, the user can instead provide a QR code associated with a particular sub-inbox, such that the purchase receipt can be transmitted and stored to the sub-inbox. This allows the user to avoid additional unwanted mailings (e.g., spam) to their personal email inbox by the entity. Further, through a one-time-use QR code, the electronic file inbox is also protected from receiving any unwanted electronic files or messages after the QR code is used to acquire the purchase receipt. Additionally, displaying a QR code to a merchant enhances user experience and also protects the user against potential fraud. In this regard, the user does not have to speak or type their email address into a kiosk, which increases the chances of their email address being exposed (e.g., to onlookers or in a later data breach associated with the merchant).

In some embodiments, a user may access electronic files stored in their electronic file inbox of their mobile banking application in order to view the files, export the files, and/or the like. In some embodiments, additional security measures may be taken by the EFM system 102 in response to an attempting to access an electronic file stored in the electronic file inbox. For instance, the EFM system 102 may authenticate a user prior to allowing the user to view an electronic file (even though the user was previously authenticated when accessing the mobile banking application). This re-authentication may provide an additional level of security for stored electronic files in the event the user device is compromised after the user having authenticated to the mobile banking application. Turning to FIG. 6, example operations are shown for securely presenting electronic files.

As shown by operation 602, the apparatus 200 includes means, such as processor 202, memory 204, communications hardware 206, and/or the like, for receiving an electronic file display request. The electronic file display request may be received, for example, in response to a user selecting a graphical button or the like representing an electronic file within their mobile banking application to display the electronic file on their user device.

As shown by operation 604, the apparatus 200 includes means, such as processor 202, memory 204, authentication engine 220, and/or the like, for requesting authentication data from a user in response to the electronic file display request. In this regard, the EFM system 102 may prompt the user (e.g., via the mobile banking application) to provide authentication data, e.g., a credential, which serves to identify the user to the EFM system 102 (i.e., ensure the user providing the electronic file display request is authorized to view the electronic file).

In some embodiments, e.g., during registration with the mobile banking application (or other application associated with the EFM system 102), a user may create a credential associated with their user identifier. For example, in some embodiments, a credential may comprise a Personal Identification Number (PIN), password, secret question and answer, and/or other similar alphanumeric-based credential. In some embodiments, a credential may comprise a biometric marker of the user. For example, the individual may provide a fingerprint (or other biometric) via the mobile application during registration such that the submitted credential is stored (e.g., in memory 204, storage device 110, and/or the like) in association with their user identifier by the EFM system 102. In this regard, the apparatus 200 includes means, such as processor 202, memory 204, communications hardware 206, or the like, for storing a user identifier in association with a credential. In some embodiments, the stored credential may be used to validate a submitted credential each time the individual engages with their electronic file inbox or a sub-inbox of the electronic file inbox (e.g., to view or export a stored electronic file), or more generally when performing certain actions in the mobile banking application (e.g., signing in, transferring funds, etc.).

In response to the request, a user may supply the requested credential. In this regard, the apparatus 200 includes means, such as processor 202, memory 204, communications hardware 206, and/or the like, for receiving a user-supplied credential from the user device. For example, in examples in which the credential is a biometric marker such as a fingerprint, the individual may supply their fingerprint via a fingerprint scanner of their personal user device.

The EFM system 102 may then validate the credential upon receiving the credential. In this regard, as shown in operation 606, the apparatus 200 includes means, such as processor 202, memory 204, authentication engine 220, and/or the like, for validating the authentication data. In some embodiments, the validation may involve comparing the user-supplied credential with a stored credential associated with the user identifier. For example, the EFM system 102 may verify that the credential submitted in response to the request matches a stored credential associated with the user identifier (e.g., the stored credential being the credential initially supplied by the user during registration or the like).

In some embodiments, such as instances in which the credential is a biometric marker (e.g., a fingerprint), the EFM system 102 may confirm that the submitted credential shares enough similarities to a stored biometric marker to satisfy a predefined similarity threshold. For example, the authentication circuitry 210 may preprocess the submitted biometric marker (e.g., to remove noise, inconsistencies, and/or the like) and compare the preprocessed biometric marker to the stored biometric marker using a matching algorithm, such as minutiae-based matching or pattern matching. A resulting match score may then be compared with a predefined similarity threshold. In some embodiments, if the match score exceeds the predefined similarity threshold, the credential may be successfully validated.

Figure 6:
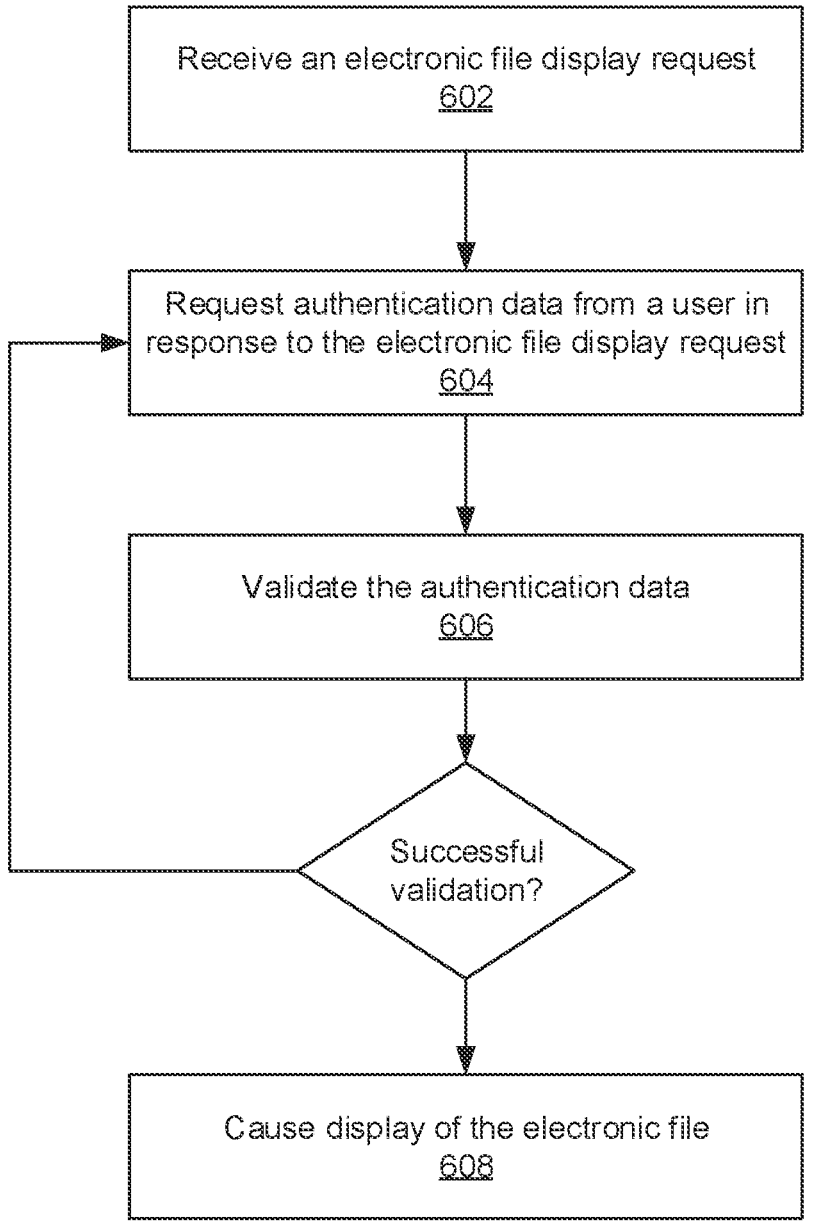
FIG. 6 illustrates an example flowchart for securely presenting electronic files, in accordance with some example embodiments described herein.

As shown in FIG. 6, if the authentication data cannot be successfully validated, the method may continue to operation 604, wherein the authentication engine 220 may again request authentication data from the user in response to the request. In this regard, the authentication engine 220 may also provide a notification to the user indicating an unsuccessful validation of the supplied credential. The notification may be transmitted back to the user device for presentation at the user device. In this regard, the notification may prompt (e.g., via a display of the notification) the user to resubmit their credential (e.g., due to a potential bad reading of a biometric or mistyping of a PIN).

In response to a successful validation of the authentication data, the method may continue to operation 608, wherein the apparatus 200 includes means, such as processor 202, memory 204, communications hardware 206, and/or the like, for causing display of the electronic file.

Figure 7:
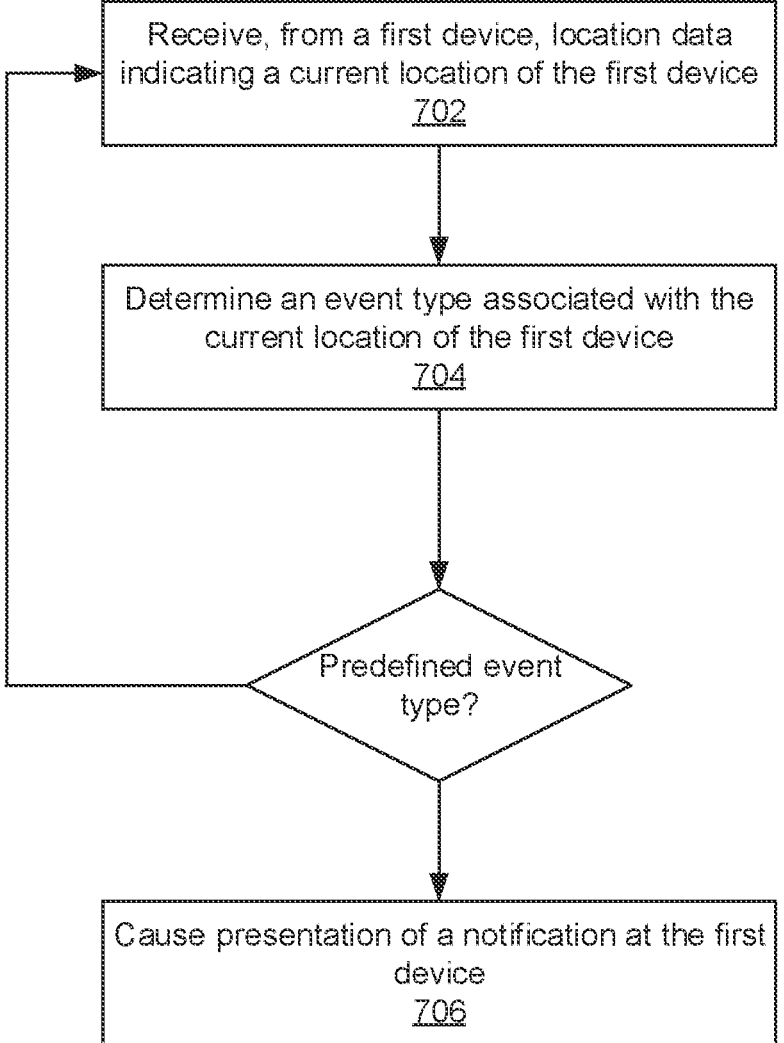
FIG. 7 illustrates an example flowchart for presenting notifications based on a determined context, in accordance with some example embodiments described herein.

As noted above, in various embodiments, the EFM system 102 may perform contextual analysis based on current location data of a user device in order to determine a type of event the user may currently be involved in. Example event types may include (but are not limited to) charity events, educational events, auctions, galas, medical events (e.g., a hospital stay), travel events (e.g., airport visits, hotel stays, etc.), and the like. The EFM system 102 may leverage this information to notify the user of potential electronic files that may be generated from or otherwise associated with the event such that the user is enabled to store those electronic files to the electronic file inbox in due course. Turning to FIG. 7, example operations are shown for presenting notifications based on a determined context.

As shown by operation 702, the apparatus 200 includes means, such as processor 202, memory 204, communications hardware 206, and/or the like, for receiving, from a first device, location data indicating a current location of the first device. For example, through a mobile banking application installed on a user device, location data of the user device may be shared with the EFM system 102 (e.g., according to user permissions). In this regard, in some embodiments, the EFM system 102 may continuously (e.g., at predefined time intervals) collect location data from a user device. Location data may be obtained via GPS, Wi-Fi, cellular network triangulation, and/or other location sensing technologies of the user device. Location data may include latitude and longitude coordinates as well as contextual information such as timestamps, altitude, and the like.

As shown by operation 704, the apparatus 200 includes means, such as processor 202, memory 204, context analysis engine 222, and/or the like, for determining an event type associated with the current location of the first device. For instance, based on a current location of the device, and in connection with one or more other factors, the context analysis engine 222 may identify a particular event type which the user may be attending or involved with. To do so, the context analysis engine 222 may preprocess the location data (e.g., to smooth the location data for any irregularities and convert it into a format suitable for a ML algorithm) and extract features from the location data. Such features may include geographical features (e.g., distances to specific landmarks, event venues, or known event locations), temporal features (e.g., time of day and/or week, holidays or other special occasions), and historical features (e.g., previous location patterns and event attendance history). The context analysis engine 222 may then utilize a trained ML model to predict an event type based on the location data and the features extracted from the location data. For example, the ML model may be trained using labeled data (e.g., historical location data associated with known event types). The ML model may comprise one or more ML algorithms, such as, for example, decision trees, random forests, deep learning models (e.g., neural networks), and/or support vector machines.

Once the event type is determined, the context analysis engine 222 may determine whether the event type corresponds to a predefined event type. For instance, the EFM system 102 may store a record of predefined event types which include specific types of events which may produce electronic files (e.g., financial electronic files) which should be stored in the electronic file inbox. For instance, certain event types may produce purchase receipts, invoices, or other electronic documents. As one example, a user's attendance at a charity auction may produce a receipt (which the user can later claim for a tax deduction). However, certain event types may not produce electronic files (e.g., the user may simply be walking in the park) and thus the EFM system 102 may only prompt notification regarding electronic files when the event type corresponds to a predefined event type.

As shown in FIG. 7, if the determined event type is not a predefined event type, the method may return to operation 702 wherein the EFM system 102 continues to receive location data for the device. If the determined event type is a predefined event type, the method may continue to operation 706, wherein the apparatus 200 includes means, such as processor 202, memory 204, communications hardware 206, and/or the like, for causing presentation of a notification at the first device. In some embodiments, the notification may indicate a relevance of the event type to an electronic file (e.g., an electronic file stored in the electronic file inbox). For example, if the user is shopping at a hardware store, the EFM system 102 may prompt a notification to the user pointing to a recently stored purchase receipt from the hardware store (e.g., due to the possibility of the user performing a return of merchandise). Additionally or alternatively, in some embodiments, the notification may indicate a relevance of the event type to an electronic file not yet stored in association with the electronic file inbox of the mobile banking application. For example, if the user is attending a charity event, the notification may remind the user to upload and store any physical paper receipts from donations made at the event to the electronic file inbox for tax deduction purposes.

Figure 8:
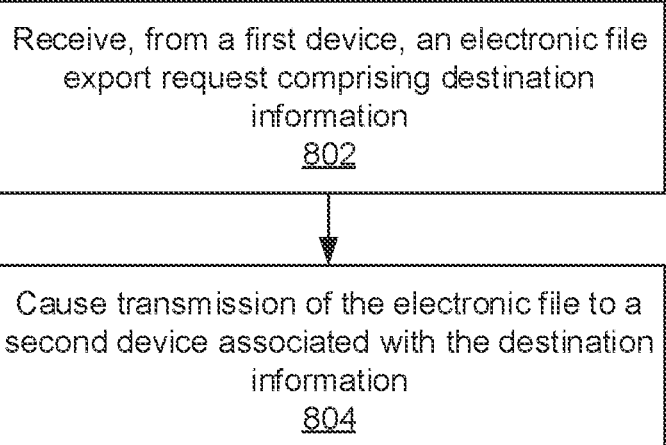
FIG. 8 illustrates an example flowchart for managing exportation of electronic files, in accordance with some example embodiments described herein.

In some embodiments, the EFM system 102 may enable a user to export electronic files (or copies of electronic files) from the electronic file inbox to various other platforms and across a variety of channels. Turning to FIG. 8, example operations are shown for managing exportation of electronic files.

As shown by operation 802, the apparatus 200 includes means, such as processor 202, memory 204, communications hardware 206, and/or the like, for receiving, from a first device, an electronic file export request comprising destination information. For example, the electronic file export request may be received, for example, in response to a user selecting a graphical button or the like, within their mobile banking application, representing an export of an electronic file and in response to the user entering destination information for the export. For instance, the user may provide an email address (such that the electronic file will be exported by way of email to the email address), phone number, or other destination information. In some embodiments, a user may enter destination information for multiple destinations, such that copies of the electronic file may be exported simultaneously to all destinations (e.g., to multiple email addresses). For example, this may be advantageous for business owners who wish to provide invoices to multiple clients at once in that the invoices are maintained in a secure setting (e.g., within the confines of the mobile banking application). As shown by operation 804, the apparatus 200 includes means, such as processor 202, memory 204, communications hardware 206, and/or the like, for causing transmission of the electronic file to a second device associated with the destination information.

FIGS. 3-8 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved electronic file management. Example embodiments thus provide tools that overcome the problems exhibited when attempting to manage electronic files across a multitude of cloud storage options. Storing electronic files within an electronic file inbox of a mobile banking application, as discussed herein, provides numerous benefits. First, it centralizes crucial financial documents, such as statements, purchase receipts, transaction records, tax-related forms, and the like in a single, secure location easily accessible from anywhere. This streamlined access enhances convenience, as users are able to access electronic files promptly without needing to search through various platforms or accounts. Additionally, the high-security standards upheld by mobile banking applications ensure the confidentiality and protection of sensitive information. Through the electronic file inbox, users can also maintain a well-organized record of financial interactions, which is organized automatically and logically based on file types. Use of the electronic file inbox not only simplifies document storage, but also reinforces data security and fosters effective financial oversight. Further, through use of machine-readable indicia configured for specific sub-inboxes, privacy is maintained in that a user need not reveal sensitive contact information (e.g., email addresses and the like) to others when attempting to obtain an electronic file (such as a purchase receipt or the like). Further, as discussed herein, the EFM system may also automatically reconcile line item transactions based on stored electronic files, providing users with peace of mind that their transactions are legitimate and they are not being overcharged.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   obtaining, by interface circuitry, an electronic file associated with a third-party application;
   determining, by a classification engine, a first classification of the electronic file;
   determining, by the classification engine, a second classification of the electronic file;
   selecting, by an inbox allocation engine and based on the second classification of the electronic file, a first storage location associated with an electronic file inbox of a mobile banking application; and
   storing, by the inbox allocation engine, the electronic file in association with the first storage location.

2. The method of claim 1, further comprising:
   reconciling, by a transaction analysis engine, a line item transaction of the mobile banking application based on the electronic file.

3. The method of claim 2, wherein the electronic file comprises a purchase receipt.

4. The method of claim 2, wherein reconciling the line item transaction comprises:

determining, by the transaction analysis engine, a match between a payment amount indicated by the line item transaction and a payment amount indicated by the electronic file; and causing display, by communications hardware, of an indication of a successful reconciliation of the line item transaction.

5. The method of claim 4, wherein causing display of the indication of the successful reconciliation of the line item transaction comprises:

modifying, by a visualization engine, a visualization of the line item transaction within the mobile banking application.

6. The method of claim 5, wherein modifying the visualization of the line item transaction comprises at least one of:

altering a color of the visualization of the line item transaction; and displaying a graphical icon representing the successful reconciliation of the line item transaction in the visualization of the line item transaction.

7. The method of claim 1, wherein determining the first classification of the electronic file comprises:

identifying, by the classification engine, one or more keywords of a predefined keyword set that are present within the electronic file; and determining, by the classification engine, a confidence score for the electronic file based on the identified one or more keywords, wherein the first classification is determined based on the confidence score satisfying a first predefined threshold.

8. The method of claim 1, further comprising:

generating, by an inbox communication engine, a barcode for the first storage location, wherein a scanning of the barcode by a scanning device facilitates a transmission of at least one electronic file to the first storage location for storage;

receiving, by communications hardware, an indicia display request associated with the first storage location; and causing, by the communications hardware, presentation of the barcode for the first storage location via a display of a device.

9. The method of claim 8, wherein the barcode for the first storage location is a one-time-use barcode.

10. The method of claim 1, further comprising:

receiving, by communications hardware and from a first device, an electronic file display request;

requesting, by an authentication engine, authentication data from a user in response to the electronic file display request;

validating, by the authentication engine, the authentication data; and in response to a successful validation of the authentication data:

causing, by the communications hardware, display of the electronic file.

11. The method of claim 1, further comprising:

receiving, by communications hardware and from a first device, location data indicating a current location of the first device;

determining, by a context analysis engine, an event type associated with the current location of the first device;

in an instance in which the event type corresponds to a predefined event type:

causing, by the communications hardware, presentation of a notification at the first device, wherein the notification indicates at least one of:

a relevance of the event type to the electronic file, and a relevance of the event type to a second electronic file not yet stored in association with the electronic file inbox of the mobile banking application.

12. The method of claim 1, further comprising:

receiving, by communications hardware and from a first device, an electronic file export request comprising destination information; and causing transmission, by the communications hardware, of the electronic file to a second device associated with the destination information.

13. An apparatus comprising:

interface circuitry configured to obtain an electronic file associated with a third-party application;

a classification engine configured to:

determine a first classification of the electronic file, and determine a second classification of the first electronic file; and an inbox allocation engine configured to:

select, based on the second classification of the electronic file, a first storage location associated with an electronic file inbox of a mobile banking application; and store the electronic file in association with the first storage location.

14. The apparatus of claim 13, further comprising:

a transaction analysis engine configured to reconcile a line item transaction of the mobile banking application based on the electronic file.

15. The apparatus of claim 14, wherein the transaction analysis engine reconciles the line item transaction by determining a match between a payment amount indicated by the line item transaction and a payment amount indicated by the electronic file; and wherein the apparatus further comprises communications hardware configured to cause display of an indication of a successful reconciliation of the line item transaction.

16. The apparatus of claim 15, further comprising a visualization engine configured to modify a visualization of the line item transaction within the mobile banking application.

17. The apparatus of claim 13, further comprising an inbox communication engine configured to generate a barcode for the first storage location, wherein a scanning of the barcode by a scanning device facilitates a transmission of at least one electronic file to the first storage location for storage; and wherein the apparatus further comprises communications hardware configured to:

receive an indicia display request associated with the first storage location, and cause presentation of the barcode for the first storage location via a display of a device.

18. The apparatus of claim 17, wherein the barcode for the first storage location is a one-time-use barcode.

19. The apparatus of claim 13, further comprising communications hardware configured to:

receive, from a first device, location data indicating a current location of the first device; and wherein the apparatus further comprises a context analysis engine configured to:

determine an event type associated with the current location of the first device, wherein the communications hardware is further configured to, in an instance in which the event type corresponds to a predefined event type:

cause presentation of a notification at the first device, wherein the notification indicates at least one of:

a relevance of the event type to the electronic file, and a relevance of the event type to a second electronic file not yet stored in association with the electronic file inbox of the mobile banking application.

20. A computer program product comprising at least one non-transitory computer-readable storage medium storing software instructions that, when executed, cause an apparatus to:

obtain an electronic file associated with a third-party application;

determine a first classification of the electronic file;

determine a second classification of the electronic file;

select, based on the second classification of the electronic file, a first storage location associated with an electronic file inbox of a mobile banking application; and store the electronic file in association with the first storage location.

\* \* \* \* \*